United States Patent [19]

Brossard et al.

[11] 4,417,219

[45] Nov. 22, 1983

[54] PHASE DISPLACEMENT MODULATOR

[76] Inventors: Pierre Brossard, 9 rue des Fleurs, Montigny-le-Bretonneux F-78190 Trappes; Daniel Duponteil, 45, rue Anatole France, 92370 Chaville, both of France

[21] Appl. No.: 200,471

[22] Filed: Oct. 24, 1980

[30] Foreign Application Priority Data

Oct. 31, 1979 [FR] France .................. 79 27519

[51] Int. Cl.$^3$ .................. H03K 7/06; H04L 27/20
[52] U.S. Cl. .................. 332/9 R; 332/21; 332/23 R; 375/52; 375/53; 375/67
[58] Field of Search .................. 332/9 R, 9 T, 16 R, 332/16 T, 21, 23 R; 375/52-57, 67

[56] References Cited

U.S. PATENT DOCUMENTS

| 3,750,051 | 7/1973 | Brady | 332/9 R |
| 4,168,397 | 9/1979 | Bradley | 332/16 R X |
| 4,174,505 | 11/1979 | Querry | 332/16 R X |
| 4,210,879 | 7/1980 | Poitevin et al. | 332/9 R |

FOREIGN PATENT DOCUMENTS 2127517 12/1972 Fed. Rep. of Germany .
1333951 10/1973 United Kingdom .

OTHER PUBLICATIONS

Giannini et al., "Pulsed Offset QPSK Modulator", *IBM Technical Disclosure Bulletin*, vol. 21, Jun. 1978, pp. 123-124.

*Primary Examiner*—Siegfried H. Grimm
*Attorney, Agent, or Firm*—Laff, Whitesel, Conte & Saret

[57] ABSTRACT

A phase shift binary modulator which is less sensitive to the non-linear characteristics of the transmission channel. The modulator comprises a first input to which a succession of binary bits are applied, prior to their modulation and transmission. Another input receives a clock signal at the bit rate of the succession of bits applied to the first input terminal, which is, in turn, connected to an input of a first exclusive OR gate, the output of which is connected to an input of another exclusive OR gate. The output of the other OR gate is connected to the input of a flip-flop. An output of the flip-flop is connected to the second input of the first OR gate. The clock signal drives a divider, the inverse output of which is connected to the second input of the other OR gate. The direct output of the divider is connected to an input of an AND gate. The second input of the AND gate is connected to the output of a delay circuit. The binary modulator may have either four or eight phase-shift displacements. In the four shift embodiment the binary symbol "1" is transmitted by a phase shift of $+\pi/2$, and the binary symbol "0" is transmitted by the phase-shift of $-\pi/2$. In the eight shift embodiment, the binary symbol "1" is transmitted by two successive shifts of $+\pi/4$, and the binary symbol "0" is transmitted by two successive shifts of $-\pi/4$. The successive shifts of $+$ or $-\pi/4$ are performed at a clock rate which is double the numerical rate of delivery of the modulating binary signal.

2 Claims, 17 Drawing Figures

AND GATE

OR GATE

EXCLUSIVE OR

EXCLUSIVE OR AND INVERTER

OR GATE WITH INVERTED OUTPUT TERMINAL (○—)

INHIBIT GATE

FLIP-FLOP

DIVIDE BY TWO $\pi/2$ DELAY AND DEPHASING

PHASE DISPLACEMENT MODULATOR

The present invention relates to binary modulations with displacement of the $2^N$ state phase, and with N greater than 1. It also relates to modulators which may be used to obtain those modulations.

The binary modulation by means of ($2^1$) two state phase displacement is well known under the name of MDP2. That modulation uses two states of the phases of the carrier, those two phase states being different from $\pi$. They are associated with the binary states of the numerical message to be transmitted. In order to utilize a differential demodulation, the binary symbol "1" is transmitted by a phase jump of $\pi$ and the binary symbol "0" is transmitted by a phase jump which is null. If "T" is the duration of a binary symbol, 1/T is the numerical rate of delivery, and the modulated carrier MDP2 has as its spectrum:

$$S_{MDP2}(f) = T\left[\frac{\sin(\pi fT)}{\pi fT}\right]^2 \quad (1)$$

When an MDP2 signal is transmitted, it is usual to limit its frequency band, around the carrier frequency, to a value $(1/T)(1+\alpha)$ in which $\alpha$ assumes a value ranging between 0 and 0.3.

The envelope of the MDP2 signal, which was constant before filtration, presents important fluctuations after filtration. Especially, each $\pi$ phase jump is translated by passing through 0 of the envelope. That particularity causes, for the filtered signal, a high sensitivity to the non-linearities of the transmission channel, which essentially result from the non-linear amplifiers, such as, for example, progressive wave tubes in space connections. It must, however, be recognized that the MDP2 modulation is very attractive, because it makes possible a differential demodulation which is executed by means of a very simple demodulator.

One object of the present invention is to provide for a binary symbol modulation which is less sensitive to the non-linear characteristics of the transmission channel, while making it possible to preserve the same theoretical performances in differential demodulation and the same simplicity of execution of the differential demodulator.

According to a characteristic of the present invention, a binary modulation has four state phase displacements which are different from $\pi/2$, in which the binary symbol "1" is transmitted by a phase jump of $+\pi/2$, and the binary symbol "0" is transmitted by a phase jump of $-\pi/2$. Hereafter, that modulation will be indicated by "MDP2-4".

According to another characteristic of the present invention, a binary modulation has eight state phase displacements which are different from $\pi/4$, in which the binary symbol "1" is transmitted by two successive jumps of $+\pi/4$, and the binary symbol "0" is transmitted by two successive jumps of $-\pi/4$, the successive jumps of $+$ or $-\pi/4$ being performed at a rhythm which is double the numerical rate of delivery of the modulating binary signal. Hereafter, that modulation will be designated by the expression "MDP2-8".

The above-indicacted characteristics of the invention, as well as others, will appear more clearly upon reading the following description of embodiments, the description being given relative to the attached drawing in which.

Before proceeding to the description of the embodiments of modulators which develop modulations according to the present invention, the symbology will be defined to explain the logical circuits which are used in the diagrams of those modulators.

Figure 1A:
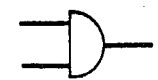
FIGS. 1a to 1i show the symbols of the logical circuits used in the diagrams of the modulators according to the present invention.
Figure 1B:
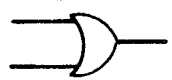
Figure 1C:
Figure 1D:
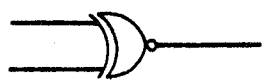
Figure 1E:
Figure 1F:
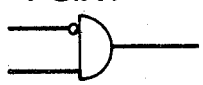
Figure 1G:
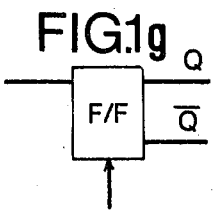
Figure 1H:
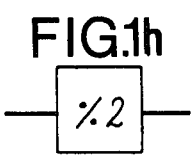
Figure 1I:
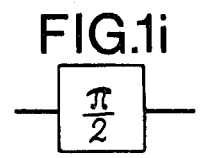

FIG. 1a shows an AND gate; in FIG. 1b, an OR gate; in FIG. 1c, a conventional exclusive OR gate; in FIG. 1d, an exclusive OR gate, the output of which is inverted relative to the output in FIG. 1c, this inversion being indicated by a small circle at the origin of the output wire of the gate in FIG. 1d; in FIG. 1e, an OR gate comprising a normal output, similar to that of the gate in FIG. 1c, the representation of that output not comprising any circle at the origin of the wire, and an inverted output, the representation of which comprises a circle at the origin of the corresponding wire; in FIG. 1f, an AND gate comprising a normal input without any circle at the end of the corresponding wire, and an inverted input with a circle at the end of the corresponding wire; in FIG. 1g, a flip-flop D with one data input and two outputs Q and $\bar{Q}$, plus a validation or clock pulse input indicated by an arrow; in FIG. 1h, a numerical divider by two; and in FIG. 1i, a delaying circuit, the delay of which is translated by a dephasing the value which is indicated inside the block.

Figure 2:
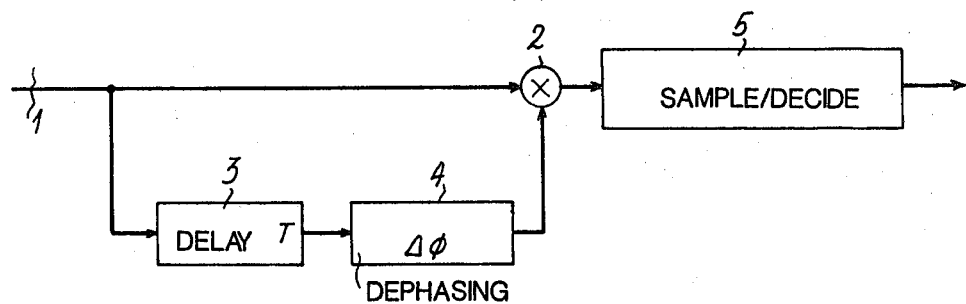
FIG. 2 is the diagram of a known differential demodulator.

In FIG. 2, there has been represented a conventional differential demodulator which comprises an input 1 to which is applied the signal to be demodulated and which is connected, on one side, to an input of a multiplier 2 and, on the other side, to the input of a delaying circuit 3, which causes a delay T. The output of delay line 3 is connected to the input of a dephasing circuit 4 causing a $\Delta\phi$ dephasing, the output of which is connected to the other input of multiplier 2. The output of multiplier 2 is connected to the input of a conventional circuit 5 for sampling and the making of decision. When modulation MDP2 is used, the dephasing $\Delta\phi$ is considered as equal to "0". The operation of the differential demodulator in FIG. 2 is conventional, and it will not be described in detail.

Figure 3:
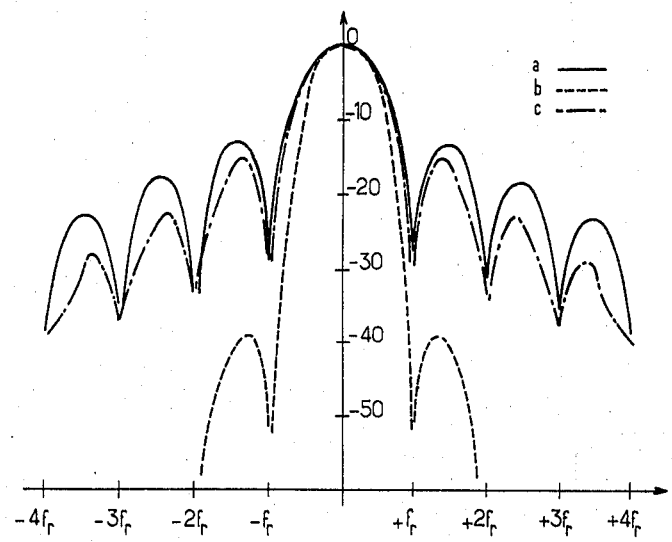
FIG. 3 represents three signal spectra with MDP2 modulation before filtering, after filtering, then after passage through a saturated amplifier.

In FIG. 3, curve 3a represents the spectrum of the modulated carrier in the case of an MDP2 modulation, the spectrum corresponding to formula (1).

Curve 3b represents the spectrum of an MDP2 signal which has been filtered in a band filter having a band width 1.2 fr, in which fr=1/T.

Curve 3 represents the spectrum of a filtered MDP2 signal, after it has run through a saturated amplifier. It is possible to see that curve 3c is closely related to curve 3a, this explaining the vulnerability of the MDP2 signal to the non-linear characteristics of the transmission channel.

According to the invention, for a modulation, the carrier phase is shifted by $\pi/2$ for each linear symbol which is transmitted. A "1" is transmitted by a phase jump of $+\pi/2$, and a "0" is transmitted by a phase jump of $-\pi/2$. The spectrum of that MDP2-4 signal is the same as that of the MDP2 signal. Indeed, we have:

$$S_{MDP2-4}(f) = S_{MDP2}(f) = T\left[\frac{\sin(\pi fT)}{\pi fT}\right]^2 \quad (2)$$

connected to an input of an AND gate 10, the second input of which is connected to the output of a delaying circuit 11, which causes a delay of $+\pi/2$, the input of which is connected to the input OL1 to which there is applied a square wave signal which constitutes the carrier to be modulated. The input OL1 further is connected to an input of an AND gate 12, the second input of which is connected to the inverted output of divider 9. The outputs of the AND gates 10 and 12 respectively are connected to the two inputs of an OR gate 13 with a normal output and an inverter output, the normal output of which is connected to an input of an AND gate 14 and the inverted output of which is connected to an input of an AND gate 15. The second input of the AND gate 14 is connected to the output Q of flip-flop 8, while the second input of the AND gate 15 is connected to the output Q of the same flip-flop. The outputs of AND gates 14 and 15 respectively are connected to two inputs of an OR gate 16, the output of which delivers the modulated signal S1.

TABLE 1

| | | | | | | | | |
|---|---|---|---|---|---|---|---|---|
| Binary message to be transmitted | 1 | 0 | 1 | 1 | 1 | 0 | 0 | 1 |
| Phase of the carrier MDP2 | $\phi_0$ | $\phi_0$ | $\phi_0+\pi$ | $\phi_0$ | $\phi_0+\pi$ | $\phi_0+\pi$ | $\phi_0+\pi$ | $\phi_0$ |
| Phase of the carrier MDP2-4 | $\phi_0$ | $\phi_0-\frac{\pi}{2}$ | $\phi_0$ | $\phi_0+\frac{\pi}{2}$ | $\phi_0+\pi$ | $\phi_0+\frac{\pi}{2}$ | $\phi_0$ | $\phi_0+\frac{\pi}{2}$ |

If demodulator in FIG. 2 is again considered, it can be seen that the differential demodulator still operates with the modulation MDP2-4 under the condition that dephasing unit 4 is provided for a dephasing of $-\pi/2$.

Figure 4:
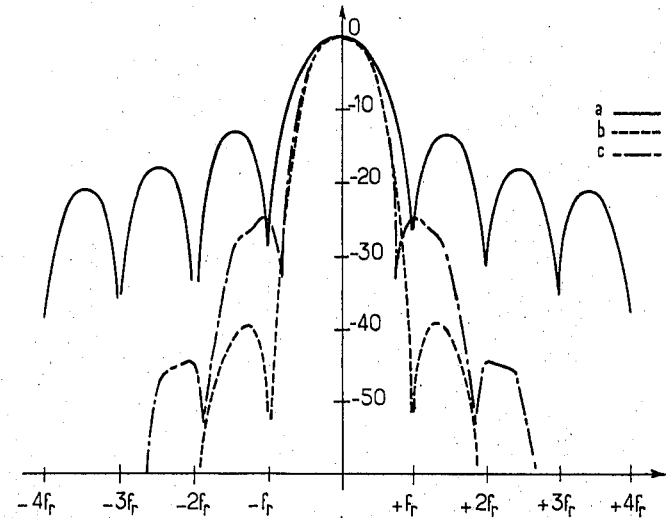
FIG. 4 represents three spectra of signals with MDP2-4 modulation, under the same conditions of treatment as in FIG. 3.

Besides, curve 4a in FIG. 4 represents the spectrum of signal MDP2-4 before filtering. The spectrum is, according to FIG. 2, the same as the one of curve 3a. Curve 4b represents the spectrum of the filtered signal, and it is the same as the curve 3b. Curve 4c represents the spectrum of the filtered signal MDP2-4, after passage through a saturated amplifier. It can be seen, by comparing curves 3c and 4c that, in this latter case, there is a very appreciable reduction of the spectrum widening phenomenon, not only on the lateral arches, but also on the main arch. That advantageous property results from the fact that there no longer exists any phase jump $\pi$, that is to say, not any more passage through "0" of the envelope of the transmitted signal.

Figure 5:
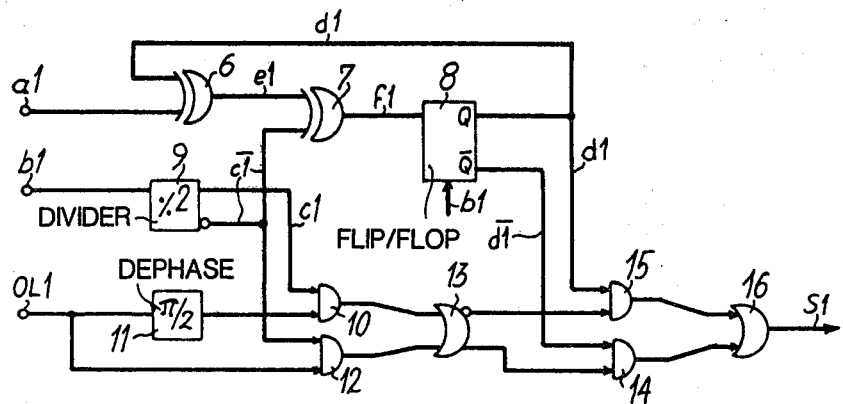
FIG. 5 is the diagram of a modulator for MDP2-4 modulation.

The modulator in FIG. 5 comprises an input a1 to which there is applied the succession of the binary bits to be transmitted, and an input b1 which delivers a clock signal at the rhythm of the succession applied to terminal a1. Input a1 is connected to an input of an exclusive OR gate 6, the output of which is connected to an input of an exclusive OR gate 7, the output of which is connected to the input of a flip-flop D8. Output Q of flip-flop 8 is connected to the second input of gate 6. Input b1 is connected to the input of a divider by two 9, the inverter output of which is connected to the second input of gate 7. The direct output of divider 9 is The following Table II indicates the binary values of the signals in different points of the circuit in FIG. 5.

TABLE II

| | | | | | | | | | | | | | |
|---|---|---|---|---|---|---|---|---|---|---|---|---|---|
| a1 | 0 | 1 | 1 | 0 | 0 | 0 | 1 | 0 | 0 | 1 | 1 | 1 | 0 | 1 |
| b1 | 1 | 1 | 1 | 1 | 1 | 1 | 1 | 1 | 1 | 1 | 1 | 1 | 1 | 1 |
| c1 | 1 | 0 | 1 | 0 | 1 | 0 | 1 | 0 | 1 | 0 | 1 | 0 | 1 | 0 |
| e1 = a10d1 | | 1 | 1 | 1 | 0 | 0 | 0 | 0 | 1 | 0 | 0 | 1 | 0 | 1 |
| f1 = e10c1 | 0 | 0 | 1 | 0 | 0 | 1 | 0 | 1 | 1 | 1 | 0 | 0 | 0 | 0 |
| d1 | 0 | 0 | 1 | 0 | 0 | 1 | 0 | 1 | 1 | 1 | 0 | 0 | 0 | 0 |
| S1 phase | 0 | $\eta/2$ | $\eta$ | $\eta/2$ | 0 | $3\eta/2$ | 0 | $3\eta/2$ | $\eta$ | $3\eta/2$ | 0 | $\eta/2$ | 0 | |
| phase jump | | $\frac{\eta}{2}$ | $+\frac{\eta}{2}$ | $-\frac{\eta}{2}$ | $-\frac{\eta}{2}$ | $-\frac{\eta}{2}$ | $+\frac{\eta}{2}$ | $-\frac{\eta}{2}$ | $-\frac{\eta}{2}$ | $+\frac{\eta}{2}$ | $+\frac{\eta}{2}$ | $+\frac{\eta}{2}$ | $-\frac{\eta}{2}$ | |

In Table II, c1 is the signal of the direct output of divider 9, e1 is the output signal of gate 6, f1 is the output signal of gate 7, and d1 is the output signal of the output Q of the flip-flop 8. From the above Table, there are immediately deduced the binary values c1 and d1 indicated in FIG. 5.

Figure 6:
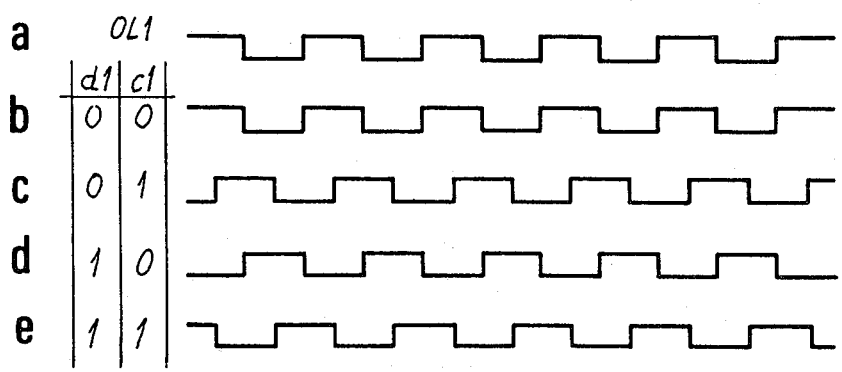
FIG. 6 shows shapes of signals in various points of the modulator in FIG. 5.

The curves in FIG. 6 also make it possible to illustrate the functioning of the circuit in FIG. 5. FIG. 6a represents the wave shape of a square wave signal applied to input OL1, that is to say, the non-modulated carrier. FIG. 6b represents the signal at output S1, when there are C1=0 and d1=0. FIG. 6c represents the signal at the output S1 when there is the condition C1=1 and d1=0. FIG. 6d represents the signal at output S1 when there is the condition c1=0 and d1=1. FIG. 6e represents the signal at output S1 when the condition is c1=1 and d1=1.

It appears upon examination of the curves in FIGS. 6b to 6e, that each one of them can be deduced from the preceding one by means of a delay or dephasing of $+\pi/2$. It is easy, when taking each one of those conditions and the circuit represented in FIG. 5, to verify those curves. In addition, it is also possible to deduce from them the succession of the phases of S1 which is indicated in Table II when there has been chosen the sequence a1 which is indicated. Therefore, there is deduced from sequence a1 the sequence of the phase jumps indicated in Table II.

It truly appears that a binary "1" is transmitted by a phase jump of $+\pi/2$, and a binary "0" by a phase jump of $-\pi/2$. The modulated signal obtained in S1 is not a sinusoidal curve modulated by phase displacement, but a square wave signal modulated by phase displacement. The difference between those two signals results from the existence, in the second case, of harmonics at the frequencies of $3f_p, 5f_p, 7f_p, \ldots$ in which $f_p$ is the carrier frequency. It would be possible to mount a filter behind the output S1. In fact, the filter usually used during emission, limits the spectrum around the carrier frequency and, by the same occasion, eliminates the harmonics, so that the signal transmitted effectively is the conventional signal, that is to say, a sinusoidal curve modulated by phase displacement.

Another variation of the present invention provides for a modulation in which the carrier phase is shifted by $+90\ /2$ at each transmitted binary symbol, a "1" being transmitted by two successive jumps of $+\pi/4$ and an "0" being transmitted by two successive phase jumps of $-\pi/4$. The spectrum of that MDP2-8 signal satisfies the following formula:

$$DMP2-8(f) = \frac{T}{8}\left[\frac{\sin(3\pi fT/2)}{3\pi fT/2} + (2\frac{1}{2} - 1)\frac{\sin(\pi fT/2)}{\pi fT/2}\right]^2 \quad (3)$$

As seen by the curve in FIG. 7a, which represents the spectrum corresponding to FIG. 3, the central arch of that spectrum is narrower than the central arch of curve 3a relative to the spectrum of signal MDP2, and the lateral arches are lower. The results from the above are that the filtering of a signal which presents that spectrum is easier to execute. It must be noted, further, that the modulation in successive jumps is a close version of the MSK modulation (minimum shift keying), in which the phase jumps of $+\pi/2$ and $-\pi/2$ occur in a continuous manner, that is to say, the phase jump is not instantaneous, but lasts over one symbol.

Curve 7b represents the spectrum of an MDP-8 signal which has been filtered, and curve 7c represents the spectrum of the filtered MDP2-8 signal, after passage through a saturated amplifier. It may be seen, by comparing curve 7c with curve 3c, as well as with curve 4c that there is a practically complete disappearance of the spectrum widening phenomenon. That property results from the fact that there are no longer any $\pi$ phase jump, and that the result is close to the MSK modulation.

Table III below makes it possible to compare the carrier phases in MDP2 and in MDP2-8 modulation, for the same binary message transmitted.

ates with the MDP2-8 modulation, under a condition to provide for dephasing unit 4 with a $-\pi/2$ dephasing.

Figure 8:
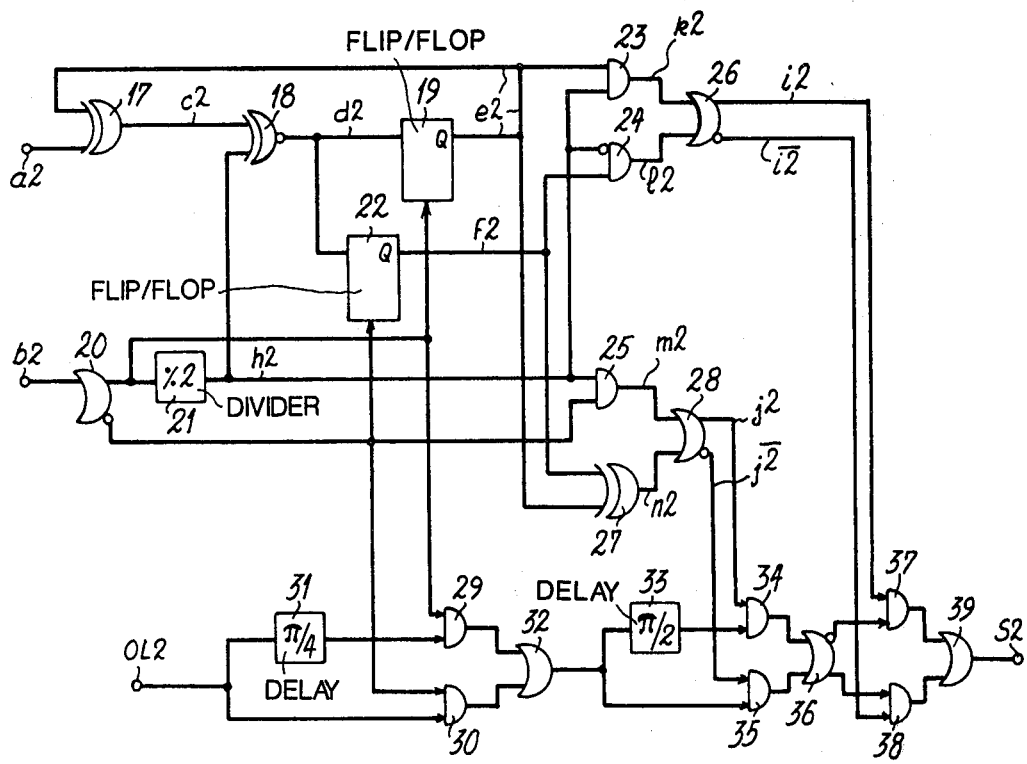
FIG. 8 is the diagram of a modulator for MDP2-8 modulation.

The modulator in FIG. 8 comprises an input a2 to which is applied the succession of binary bits to be transmitted, and an input b2 which delivers a clock signal at the rhythm of the pulse train applied to a2. Input a2 is connected to an input of an exclusive OR gate 17, the output of which is connected to an input of an exclusive OR gate 18 with an inverted output. The output of gate 18 is connected to the input of a flip-flop D19. Output Q of flip-flop 19 is connected to the second input of gate 17. Input b2 is connected to the input of an OR gate 20 with direct and inverted output. The direct output of gate 20 is connected, on one side, to the input of a divider by two 21 and, on the other side, to the validation of clock pulse input at the bottom of flip-flop 19. The inverted output of gate 20 is connected to the validation or clock pulse input at the bottom of flip-flop 22. The output of divider by two 21 is connected to the second input of gate 18, to an input of an AND gate 23, to the inversion input of an AND gate 24, and to an inut of an AND gate 25. The second input of AND gate 23 is connected to the output of Q of flip-flop 19. The second input of AND gate 24 is connected to the output Q of flip-flop 22. The second input of AND 25 is connected to the inverted output of OR gate 20. The output of AND gate 23 and the output of AND gate 24 are respectively connected to the inputs of an OR gate 26 comprising a direct output and an inverted output. Output Q of flip-flop 19 and the output Q of flip-flop 22 are respectively connected to the inputs of an exclusive OR gate 27. The output of AND gate 25 and the output of gate 27 are respectively connected to the inputs of an OR gate 28 comprising a direct and an inverted output.

The direct output of OR gate 20 is connected to an input of an AND gate 29 while the inverted output of 20 is connected to an input of an AND gate 30. The second input of gate 29 is connected to the output of a delaying circuit 31, the input of which is connected to the input OL2 to which the square wave signal, which constitutes the non-modulated carrrier, is applied. The second input of gate 30 is directly connected to input OL2. The delay caused by circuit 31 corresponds to a dephasing of $+\pi/4$ for the carrier applied to OL2. The outputs of gates 29 and 30 are respectively connected to the inputs of an OR gate 32, the output of which is connected, on one side, to a delaying circuit 33, the output of which is connected to an input of an AND gate 34 and, on the other side, to an input of an AND gate 35. The second input of gate 34 is connected to the direct output of the OR gate 28, while the second input of gate 35 is connected to the inverted output of gate 28. The outputs of gates 34 and 35 are respectively connected to the inputs

TABLE III

| Binary message to be transmitted | 1 | 0 | 1 | 1 | 1 | 0 | 0 | 1 |
|---|---|---|---|---|---|---|---|---|
| Phase of carrier MDP2 | $\phi_0$ | $\phi_0$ | $\phi_0^{+\eta}$ | $\phi_0$ | $\phi_0^{+\eta}$ | $\phi_0^{+\eta}$ | $\phi_0^{+\eta}$ | $\phi_0$ |
| Phase of carrier MDP2-8 | $\phi_0$ | $\phi_0 - \frac{\eta}{4}$ | $\phi_0 - \frac{\eta}{4}$ | $\phi_0 + \frac{\eta}{4}$ | $\phi_0 + \frac{3\pi}{4}$ | $\phi_0 + \frac{3\pi}{4}$ | $\phi_0 + \frac{\pi}{4}$ | $\phi_0 + \frac{\pi}{4}$ |
| | | $\phi_0 + \frac{\eta}{2}$ | $\phi_0$ | $\phi_0 + \frac{\eta}{2}$ | $\phi_0^{+\pi}$ | $\phi_0 + \frac{\eta}{2}$ | $\phi_0$ | $\phi_0 + \frac{\eta}{2}$ |

If there is again considered the demodulator in FIG. 2, it appears that the differential demodulator still operof an OR gate 36 comprising an inverted output which is connected to an input of an AND gate 37, and a direct output which is connected to an input of an AND gate 38. The second input of gate 37 is connected to the direct output of OR gate 26, while the second input of gate 38 is connected to the inverted output of 26. The outputs of gates 37 and 38 are respectively connected to the inputs of an OR gate 39, the output of which is connected to the output of modulator S2 which delivers the modulated signal.

Figure 7:
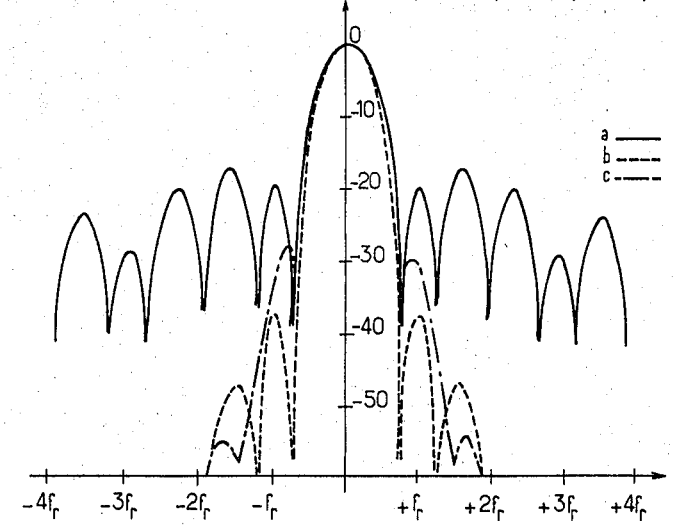
FIG. 7 represents three spectra of signals with MDP2-8 modulation, under the same conditions of treatment as in FIG. 3.

In Table IV below, there has been indicated the binary values of the signals in different points of the circuit in FIG. 7.

TABLE IV

| | | | | | | | | | | | | | | | | |
|---|---|---|---|---|---|---|---|---|---|---|---|---|---|---|---|---|
| a2 | 1 | | 0 | | 0 | | 0 | | 1 | | 1 | | 0 | | 1 | |
| b2 | 1 | 0 | 1 | 0 | 1 | 0 | 1 | 0 | 1 | 0 | 1 | 0 | 1 | 0 | 1 | 0 | 1 |
| h2 | 1 | 1 | 0 | 0 | 1 | 1 | 0 | 0 | 1 | 1 | 0 | 0 | 1 | 1 | 0 | 0 | 1 |
| e2 | 1 | 1 | 0 | 0 | 1 | 1 | 1 | 1 | 0 | 0 | 1 | 1 | 1 | 1 | 1 | 1 | |
| $c2 = a2 \oplus e2$ | 0 | 0 | 0 | 0 | 1 | 1 | 1 | 1 | 1 | 1 | 0 | 0 | 1 | 1 | 0 | 0 | 1 |
| $d2 = \overline{c2 \oplus h2}$ | 0 | 0 | 1 | 1 | 1 | 1 | 0 | 0 | 1 | 1 | 1 | 1 | 1 | 1 | 1 | 1 | 1 |
| f2 | 1 | 1 | 1 | 0 | 0 | 1 | 1 | 1 | 1 | 0 | 0 | 1 | 1 | 1 | 1 | 1 | 1 |
| $k2 = e2 \cdot h2$ | 1 | 1 | 0 | 0 | 1 | 1 | 0 | 0 | 0 | 0 | 0 | 0 | 1 | 1 | 0 | 0 | |
| $l2 = f2 \cdot \overline{h2}$ | 0 | 0 | 1 | 0 | 0 | 0 | 1 | 1 | 0 | 0 | 0 | 1 | 0 | 0 | 1 | 1 | 0 |
| $i2 = f2 + k2$ | 1 | 1 | 1 | 0 | 1 | 1 | 1 | 1 | 0 | 0 | 0 | 1 | 1 | 1 | 1 | 1 | 1 |
| $m2 = h2 \cdot \overline{b2}$ | 0 | 1 | 0 | 0 | 0 | 1 | 0 | 0 | 0 | 1 | 0 | 0 | 0 | 1 | 0 | 0 | 0 |
| $n2 = e2 \oplus f2$ | 0 | 0 | 1 | 0 | 1 | 0 | 0 | 0 | 1 | 0 | 1 | 0 | 0 | 0 | 0 | 0 | 0 |
| $j2 = m2 + n2$ | 0 | 1 | 1 | 0 | 1 | 1 | 0 | 1 | 1 | 0 | 1 | 0 | 0 | 1 | 0 | 0 | 0 |
| Phase of S2 | $\frac{5\eta}{4}$ | $\frac{3\eta}{2}$ | $\frac{7\eta}{4}$ | 0 | $\frac{7\eta}{4}$ | $\frac{3\eta}{2}$ | $\frac{5\eta}{4}$ | $\eta$ | $\frac{3\eta}{4}$ | $\frac{\eta}{2}$ | $\frac{3\eta}{4}$ | $\eta$ | $\frac{5\eta}{4}$ | $\frac{3\eta}{2}$ | $\frac{5\eta}{4}$ | $\eta$ | $\frac{5\eta}{4}$ | $\frac{3\eta}{2}$ |
| Phase Jump | $+\frac{\eta}{4}$ | $+\frac{\eta}{4}$ | $-\frac{\eta}{4}$ | $-\frac{\eta}{4}$ | $-\frac{\eta}{4}$ | $-\frac{\eta}{4}$ | $-\frac{\eta}{4}$ | $-\frac{\eta}{4}$ | $+\frac{\eta}{4}$ | $+\frac{\eta}{4}$ | $+\frac{\eta}{4}$ | $+\frac{\eta}{4}$ | $-\frac{\eta}{4}$ | $-\frac{\eta}{4}$ | $+\frac{\eta}{4}$ | $+\frac{\eta}{4}$ | |

In Table IV, a2 is the modulating binary signal, b2 is the clock signal, h2 is the signal at the output of divider 21, e2 is the signal at the Q output of flip-flop 19, c2 is the output signal of gate 17, d2 is the output signal of gate 18, f2 is the output signal of flip-flop 22, k2 is the output signal of gate 23, l2 is the output signal of gate 24, m2 is the output signal of gate 25, n2 is the output signal of gate 27, i2 is the direct output signal of gate 26, and j2 is the direct output signal of gate 28.

Figure 9:
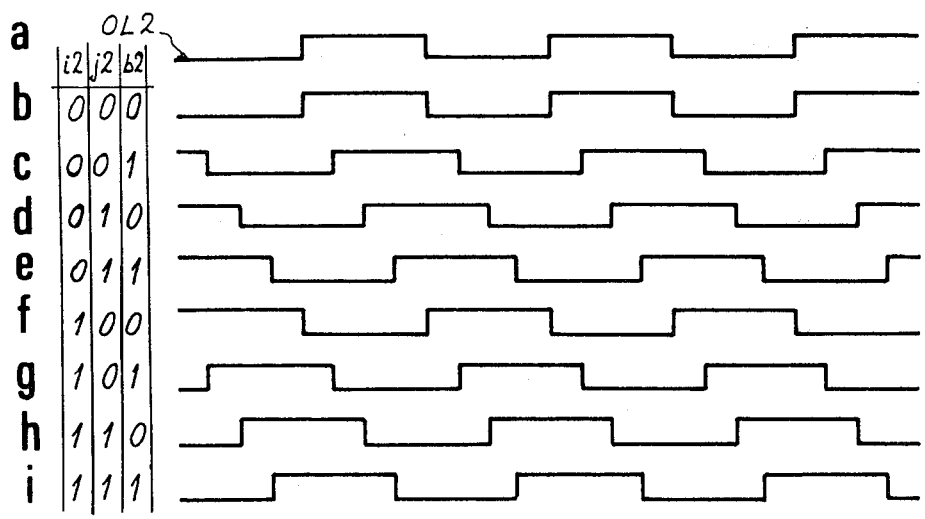
FIG. 9 shows forms of waves of signals delivered by the modulator in FIG. 8.

The curves of FIGS. 9a to 9i also make is possible the illustrate the functioning of the circuit in FIG. 8. FIG. 9a represents the wave shape of the square wave signal applied to input OL2, that is to say, the non-modulated carrier. FIG. 9b represents the signal at the output S2 when b2=j2=i2=0; FIG. 9c represents the signal at output S2 when b2=1 and j2=i2=0; FIG. 9d represents the output S2 when b2=0, j2=1 and i2=0; FIG. 9e represents the same signal when b2=j2=1 and i2=0; FIG. 9f represents the same signal when b2=j2=0 and i2=1; FIG. 9g represents the same signal when b2=1. j2=0 and i2=1; FIG. 9h represents the same signal when b2=0 and j2=i2=1; and FIG. 9i represents the same signal when b2=j2=i2=1.

It can be seen, upon examination of the curves in FIGS. 9b to 9i, that each one of those curves can be deduced from the preceding one by a time lag or dephasing of $+\pi/4$. It is easy, when considering each group (b2, j2, i2) of conditions are well as the circuit in FIG. 8, to verify those curves. Moreover, it is possible in Table IV, to deduce from each group (b2, j2, i2) at a given instant, the phase of output signal S2, and therefore, the phase succession, such as indicated in Table IV. Thus, it is also possibe to deduce the sequence of the phase jumps at the bottom of Table IV.

It really appears, when considering line a2 of Table IV and the phase jumps, that a "1" is transmitted by two successive phase jumps of $+\pi/4$ and a "0" is transmitted by two successive phase jumps of $-\pi/4$, each elementary jump being performed within one-half period of a binary bit.

We claim:

1. A binary phase-shift modulator for modulating by phase displacement in four phase-shifted states, the modulation comprising presenting four phase-shifted states which are different from $\pi/2$, transmitting the binary symbol "1" by a phase shift of $+\pi/2$, transmitting the binary symbol "0" by a phase shift of $-\pi/2$; said modulator comprising first and second exclusive OR gate means, said first exclusive OR gate means having one input coupled to receive a modulating binary signal and having an output coupled to an input of said second exclusive OR gate means, flip-flop means having an input coupled to the output of said second exclusive OR gate means, means for coupling a first exclusive OR gate means, means for coupling a first output of said flip-flop means to a second input of the first direct and inverted outputs and having an input which is coupled to receive clock signals having a timing corresponding to the bit rate of the modulating binary signal, said divide-by-two means having an inverted output which is coupled to a second input of the second exclusive Or gate means, four AND gate means, the direct and inverted outputs of said divide-by-two means being respectively coupled to first inputs of first and second of said AND gate means, the outputs of said flip-flop means being respectively coupled to first inputs of third and fourth of said AND gate means, delay circuit means which delays by $\pi/2$, the input of said delay circuit means being coupled to receive a carrier frequency which is also applied to a second input of the second AND gate means, the output of the delay circuit means being coupled to a second input of the first AND gate means, OR gate means having a direct and an inverted output, the outputs of the first and second of the AND gate means being respectively coupled to inputs of said OR gate means, said direct and inverted outputs of said OR gate means being respectively coupled to a second input of the third and fourth AND gate means, an output OR gate means, the outputs of the third and fourth AND gate means being respectively coupled to inputs of said output OR gate means, the output of which delivers the modulated signal.

2. A modulator for modulating by phase-shifted displacements in eight phase-shifted states, said modulation comprising either phase-shifted states which are different from $\pi/4$, transmitting the binary symbol "1" by two successive phase-shifts of $+\pi/4$, transmitting the binary symbol "0" by two successive phase-shifts of $-\pi/4$, performing the successive $+\pi/4$ or $-\pi/4$ phase shifts at a clock rate which is double the rate of the numerical delivery of the modulating binary bit rate; said modulator comprising three exclusive OR gate means, nine AND gate means, a first of said exclusive OR gate means having one input coupled to receive a modulating binary signal and having an output coupled to an input of a second of said exclusive OR gate means, first and second flip-flop means each having an input coupled to the output of said second exclusive OR gate means, an output of the first flip-flop means being coupled to a second input of the first exclusive OR gate means and to an inut of a first of said AND gate means and to an input of a third of said exclusive OR gate means, an output of the second flip-flop means being coupled to an input of a second of said AND gate means and to another input of the third exclusive OR gate means, four inverter OR gate means each having a normal output and an inverted output, means for applying a clock signal to the input of a first of said inverter OR gate means, the clock signal having a rate equal to the modulating binary bit signal rate, divide-by-two means, the normal output of the first inverter OR gate means being coupled to a clock pulse input of the first flip-flop means and to the input of said divide-by-two means, the output of said divide-by-two means being coupled to the other input of the second exclusive OR gate means and to an input of a third of said AND gate means and to other inputs of said first and second AND gates, said other input terminal on said second AND gate being an inhibit terminal, the second input of said third AND gate being coupled to an inverted output of the first inverter OR gate means, the inverted output of the first inverter OR gate means being further coupled to a clock pulse input of the second flip-flop means and to an input of a fourth of said AND gate means, the direct output of the first inverter OR gate means being coupled to an input of a fifth of said AND gate means, first delay circuit means, a square wave signal nonmodulated carrier being applied to the second input of the fourth of said AND gate means and to the input of said first delay circuit means which causes a dephasing of $\pi/4$, the output of said first delay means being coupled to a second input of a fifth of said AND gate means, normal OR gate means having a pair of inputs each being coupled to a respective one of the outputs of the fourth and fifth AND gate means, the outputs of the first and second AND gate means being respectively coupled to the inputs of a second of said inverter OR gate means, the outputs of the third AND gate and of the third exclusive OR gate means being respectively coupled to the inputs of a third of said inverter OR gate means, second delay circuit means having an input coupled to the output of the normal OR gate means to cause a dephasing of $\pi/2$, the output of said second delay circuit means being coupled to an input of a sixth of said AND gate means, a fourth of said inverter OR gate means having inputs coupled to the outputs of said sixth and seventh of said AND gate means, a first input of said seventh AND gate being connected to the output of said normal OR gate means, the second input of the sixth AND gate means being coupled to the direct output of the third inverter OR gate means, the second input of the seventh of the AND gate means being coupled to the inverted output of the third inverter OR gate means, the inverter output of said fourth inverter OR gate means being coupled to an input of an eighth of said AND gate means, the direct output of said fourth inverter OR gate means being coupled to an input of a ninth of said AND gate means, second inputs of the eighth and ninth AND gate means being respectively coupled to the direct and inverted outputs of the second inverter OR gate means, an output OR gate, the outputs of the eighth and ninth AND gate means being respectively coupled to the inputs of said output OR gate means, the output of which delivers the modulated signal.

* * * * *